Oct. 28, 1969 D. W. SPENCE 3,475,600

BASE LINE CONTROL CIRCUIT MEANS

Filed Feb. 28, 1966 5 Sheets-Sheet 1

INVENTOR.
DAVID W. SPENCE
BY Hayden & Pravel

BASE LINE CONTROL CIRCUIT MEANS

INVENTOR.
DAVID W. SPENCE
BY Hayden & Pravel

Fig. 2-C

INVENTOR.
DAVID W. SPENCE
BY Hayden & Pravel

BASE LINE CONTROL CIRCUIT MEANS

Filed Feb. 28, 1966

INVENTOR.
DAVID W. SPENCE
BY Hayden & Pravel

Oct. 28, 1969 D. W. SPENCE 3,475,600

BASE LINE CONTROL CIRCUIT MEANS

Filed Feb. 28, 1966 5 Sheets-Sheet 5

INVENTOR.
DAVID W. SPENCE
BY Hayden & Pravel

United States Patent Office 3,475,600
Patented Oct. 28, 1969

3,475,600
BASE LINE CONTROL CIRCUIT MEANS
David W. Spence, Houston, Tex., assignor to Infotronics Corporation, a corporation of Texas
Filed Feb. 28, 1966, Ser. No. 530,604
Int. Cl. G06g *7/18;* G06f *7/38, 15/20*
U.S. Cl. 235—183 15 Claims

ABSTRACT OF THE DISCLOSURE

An analytical measurement signal having recurrent data fluctuations which extend from a base line value are supplied to a voltage-to-frequency converter which produces output pulses having a repetition rate proportional to the amplitude of the measurement signal. A drift correction circuit is responsive to these pulses for sensing base line drift and supplying to the input of the voltage-to-frequency converter a signal for minimizing such base line drift. This drift correction circuit includes a correction signal generating crcuit for generating a correction signal dependent on base line drift, a switch circuit connected to the output thereof and a memory circuit connected to the output of the switch circuit and including a memory capacitor for storing the correction signal and a field effect transistor connected thereto for providing the signal which is fed back to the input of the voltage-to-frequency converter. A slope-sensitive circuit responsive to the measurement signal produces output signals indicating the occurrences of positive and negative slopes in the measurement signal. Such output signals are supplied to a peak recognition circuit which produces a control signal for controlling the switch circuit in the drift correction circuit for connecting the correction signal generating circuit to the memory circuit during the non-occurrence of data fluctuations and for interrupting this connection during the occurrence of data fluctuations.

This invention relates to new and useful improvements in base line control circuitry means.

The invention is an improvement over the invention shown in co-pending application Ser. No. 361,970, filed Apr. 23, 1964, now Patent No. 3,359,410, granted Dec. 19, 1967 and assigned to a common assignee of the present invention.

Analytical signals output by various sensors, voltage sources, or other transducers are normally approximately equal to zero with analytical voltage fluctuations extending from the approximate zero value of the base line of the signal. Such signals are customarily unipolar, and may have a base line value in the millivolt or microvolt range. Fluctuations from the base line value extend to some materially greater value many times greater than the typical base line value. Thus it can be appreciated that quite large voltage fluctuations occur on or extending from the typical base line value.

Because of many reasons, one such being given by way of example hereinbelow, it is sometimes desirable or even necessary to alter the base line value to accomplish various purposes. For instance, it is sometimes necessary to take the drift out of base line so that the actual onset of an analytical fluctuation is more easily ascertained. Further, it is sometimes helpful to alter a base line value as a result of the change in the quiescent value of the signal. By way of example, chromatographs are used to analyze the chemical content of samples and provide output analytical fluctuations indicative of the occurrence and concentration of the chemical constituents. Without delving too deeply into proper chromatographic operations, suffice it to say that proper techniques include the use of accelerated analysis which results in a higher base line value. Such accelerated analysis reduces the sample time because sample constituents of heavy molecular weight are made increasingly volatile to avoid prolonging the analysis. Thus, the background signal provided between analytical fluctuations is materially increased.

An additional problem arising out of chromatographic operations nad occurring in other physical phenomena to which the present invention is directed relates to the problem of obscuring small peaks by larger, adjacent peaks. Referring again to chromatographic analysis, the analytical data provided by an analyzer may indicate a very large analytical fluctuation indicating a constituent in the sample which has a very large percentage of concentration. Because of the relative size of such a large analytical fluctuation, adjacent small fluctuations are obscured by the trailing edge or portions of the large wave form and are sometimes lost. It can be appreciated that the presence of a solvent in a sample might obscure completely trace constituents of major importance in the chemical analysis. Clearly, with this example, and other examples in mind, it will be appreciated that the scope of the problem is significant.

With a view of the foregoing problems and other problems not enumerated, it is an object of the present invention to provide a new and improved base line corrector circuit means of all electronic fabrication.

Another object of the present invention is to provide a new and improved base line drift corrector which accommodates a variable base line resulting from temperature programable chromatography.

One object of the present invention is to provide a new, improved base line corrector circuit which controls the base line compensation in accordance with linear functions, exponential decay functions or in accordance with any desired time variable wave form generator.

An important object of the present invention is to provide means in a base line corrector which enables integration of small peaks following very large peaks in an analytical signal.

A further object of the present invention is to provide a new and improved base line corrector circuit which follows the analytical signal and which forms a correction signal ever ready for use, which signal is stored in an analog memory.

A related object of the present invention is to provide a new and improved analog memory for holding the last value of the base line during analytical peak fluctuations.

Other objects and advantages of one embodiment of the present invention will become more readily apparent from a description of the drawings wherein:

FIGS. 2A, 2B and 2C represent different portions of a detailed, schematic wiring diagram of the present invention;

Figure 1:
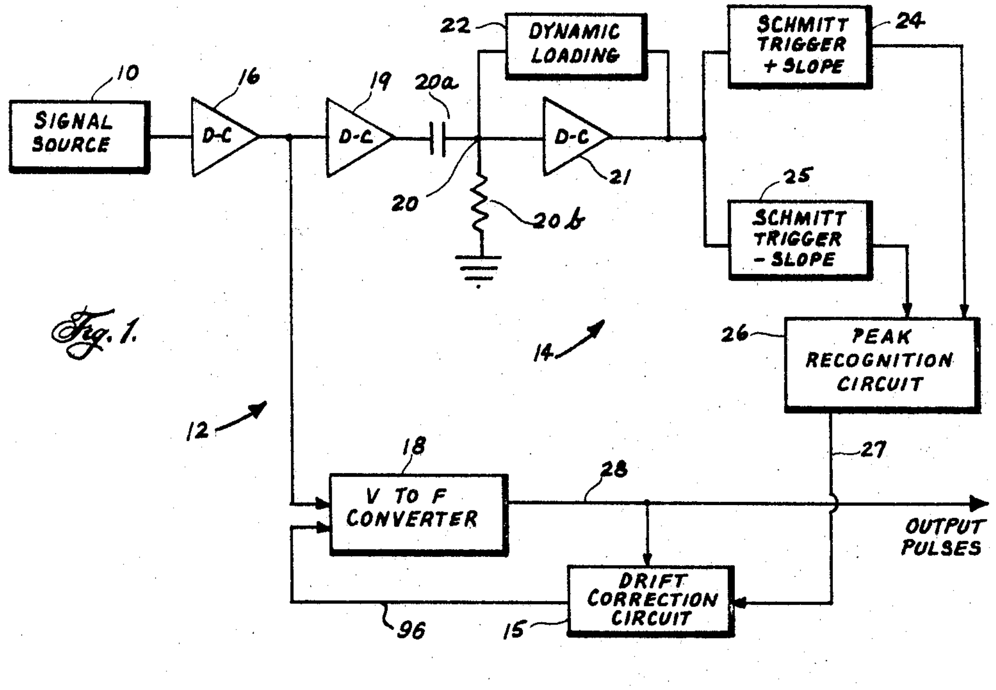
FIG. 1 is a schematic block diagram of the present invention installed to provide an adjustable base line in the signal from a signal source.

Considering the invention broadly, attention is directed to FIG. 1 which illustrates a signal source 10 in schematic lock form for providing an input signal to the apparatus of the present invention which is indicated generally by the numeral 12. The apparatus 12 includes means providing an indication of the occurrence of an analytical fluctuation in the signal provided in the source 10. Such means is indicated generally at 14 in FIG. 1. In addition, the numeral 15 indicates drift correction circuitry of the present invention which is adapted to co-operate with the input signal to correct the base line drift and to accomplish other functions as will be more thoroughly described hereinafter. The apparatusindicated generally at 14 controls operation of the drift correction means 15 so that analytical fluctuations provided by the signal source 10 in the signal are not canceled out by operation of the present invention, but wherein the present invention does cancel out drift so as to maintain a regulated base line as will be described more completely hereinafter.

Considering the invention more in detail, the signal from the source 10 is amplified by a DC amplifier 16 which provides an input for two branches of circuitry indicated at FIG. 1. One output of the amplifier 16 is provided to a voltage-to-frequency converter 18 which provides an output in the form of pulses having a repetition rate proportional to the amplitude of the input voltage. The preferred converter 18 is manufactured by the Vidar Corporation and one suitable model is Model charge stored on the plates of a capacitor and when the voltage across the capacitor reaches a predetermined level, a pulse is generated. Such pulse serves as the output pulse of the converter 18 and is also used to discharge the plates of the capacitor by a regulated amount. The drift correction means 15 of the present invention provides an input current to the capacitor in the converter 18 to obtain drift correction in accordance with operation of the present invention.

Sometimes the signal output by the amplifier 16 includes analytical fluctuations which are detected by the means indicated generally at 14. The output of the amplifier 16 is applied to a DC amplifier 19 which then inputs the signal to differentiating means 20. The differentiating means 20 includes a capacitor **20*a* and the grounded resistor 20*b* and forms a signal across the resistor 20*b* representing the derivative of the signal from the signal source 10. Thus, it will be appreciated that positive slope is indicated by a positive voltage at the differentiating means whereas negative slope is represented by negative voltage. Straight line conditions provide zero output at the differentiating means. The differentiating means is slightly loaded by an output amplifier or a post amplifier 21 (which inverts the signal) which provides a normally high impedence input to avoid loading the differentiating means 20. However, it can be appreciated that the speed of response can be altered by paralleling dynamic loading means indicated at 22 with the amplifier 21 to improve the speed of response of the differentiating means. Thus, if the slope of the signal is quite great, the differentiating means will tend to fluctuate over a large range which then causes current flow through the low resistance of the dynamic loading means 22**. In the preferred embodiment, the dynamic loading means is preferably a pair of side-by-side diodes to permit conduction with about one-half volt drop in either direction. By these means, the speed of response for the differentiating means is improved while yet preventing loading when detecting and amplifying very small voltage fluctuations relating to very small changes in slope of the signal.

It will be recognized that the output of the amplifier 21 is a normally quiescent voltage level during the absence of slope in the input signal. The quiescent voltage is varied upwardly on occurrence of negative slope in the signal and varies therebelow when the slope of the signal is positive. The means 14 incorporates a pair of Schmitt trigger circuits 24 and 25. The Schmitt trigger 24 is triggered by the occurrence of positive slope and is so constructed and arranged with circuit values chosen to recognize deviation from the quiescent value of the output of the amplifier 21 related to positive slope in the signal. On the other hand, the Schmitt trigger 25 includes circuit elements chosen to trigger operation only when the voltage level at the output of the amplifier 21 deviates from the quiescent voltage level in the opposite direction, such deviation indicating negative slope in the signal. It will be recognized that some small difference may exist between the triggering points of the Schmitt triggers 24 and 25 which difference represents a span of slope variations thought to be insignificant and defined as part of the base line drift and generally nonindicative of the occurrence of an analytical voltage fluctuation.

The output of the Schmitt triggers 24 and 25 is in the form of a pair of binary voltage levels from each circuit. The binary signals are conducted to peak recognition circuit means 26. While FIG. 5 includes additional disclosure of the circuit 26, for present purposes, it is sufficient to note that the circut 26 is operated by the binary level inputs from the Schmitt triggers 24 and 25 to provide an output signal in the conductor 27 indicating the occurrence or absence of a peak in the input signal wave form. More specifically, the occurrence of a binary signal on the conductor 27 having the logical value of zero indicates no peak in the signal from the source 10 whereas a binary one signal indicates the existence of a peak in the signal from the source 10. The circuit means 26 is arranged and constructed to maintain the peak indicating signal in the conductor 27 for an interval of time initiated on occurrence of the onset of the analytical voltage fluctuation and ending at the termination of the analytical fluctuation when the voltage level has no slope. Thus, the signal in the conductor 27 serves as one means for informing the drift correction circuitry means 15 of the occurrence of a peak so that the circuit means 15 can withhold drift correction during the analytical fluctuation. For a greater understanding of operation of the circuit means 15, reference is made to FIG. 2 and the description of the apparatus shown therein.

It should be noted that circuitry shown in FIG. 7 assists in peak detection dependent on the pulse rate output by the converter 18 as will be described in greater detail hereinafter.

Figure 2A:
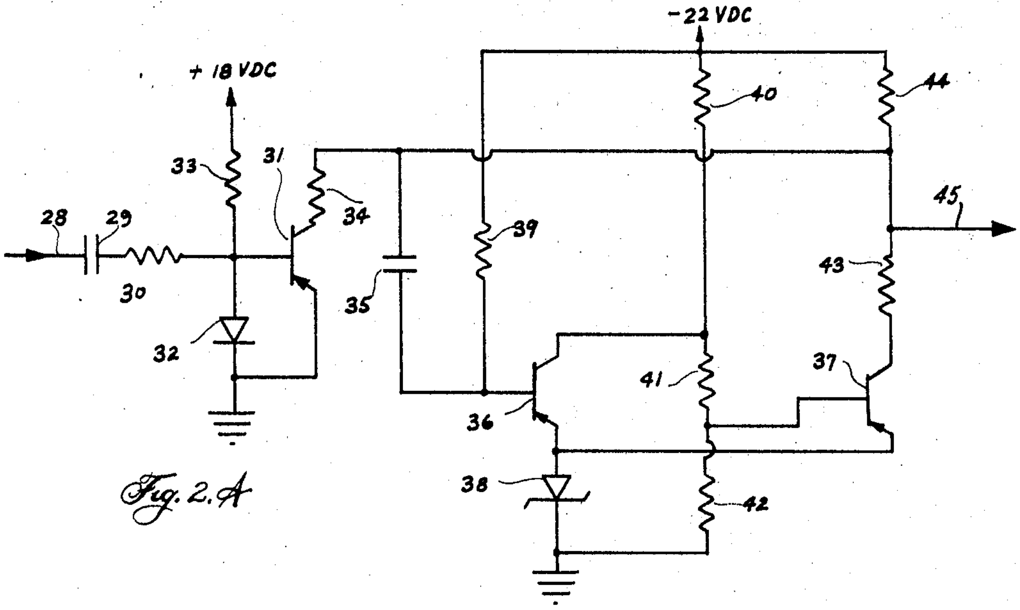

In FIG. 2A, the conductor 28 provides the output from the V-to-F converter 18 as an input through a blocking capacitor 29 and series resistor 30 to an amplifier transistor 31. The bias point of the transistor 31 is determined by the diode 32 and the bias resistor 33. A collector current limiting resistor 34 is provided for the transistor 31 and co-operates with the resistor 44 as a collector load. Output of the transistor 31 is derived through a coupling capacitor 35 and input to the first of a pair of transistors 36. The transistor 36 and a transistor 37 are provided with common emitter connections to a Zener diode 38 and serve as a monostable multivibrator. The transistor 36 is biased on by the bias resistor 39 which is connected to the collector supply voltage. Transistor 36 is provided with a collector load resistor 40 and the output of the transistor 36 is derived from the midpont of the voltage divider including resistors 41 and 42. With the voltage drop across the Zener diode 38 determined by its characteristics, conduction of the transistor 36 provides a voltage at the collector of perhaps a volt or two difference from the emitter voltage which is shared with the transistor 37. The collector voltage of the transistor 36 is reduced by the voltage divider to provide the base signal for the transistor 37. With the arrangement shown, the base of the transistor 37 is maintained negative with respect to the emitter to prevent conduction of the transistor 37. However, when a pulse is applied to the transistor 36 which tends to cut off conduction therethrough, voltage drop across the divider resistor 41 is changed to provide a base signal to the transistor 37 which turns the transistor on to form a pulse in the collector circuitry. Transistor 37 has a small series resistor 43 and a collector resistor 44 across which is developed the output signal.

Figure 2B:
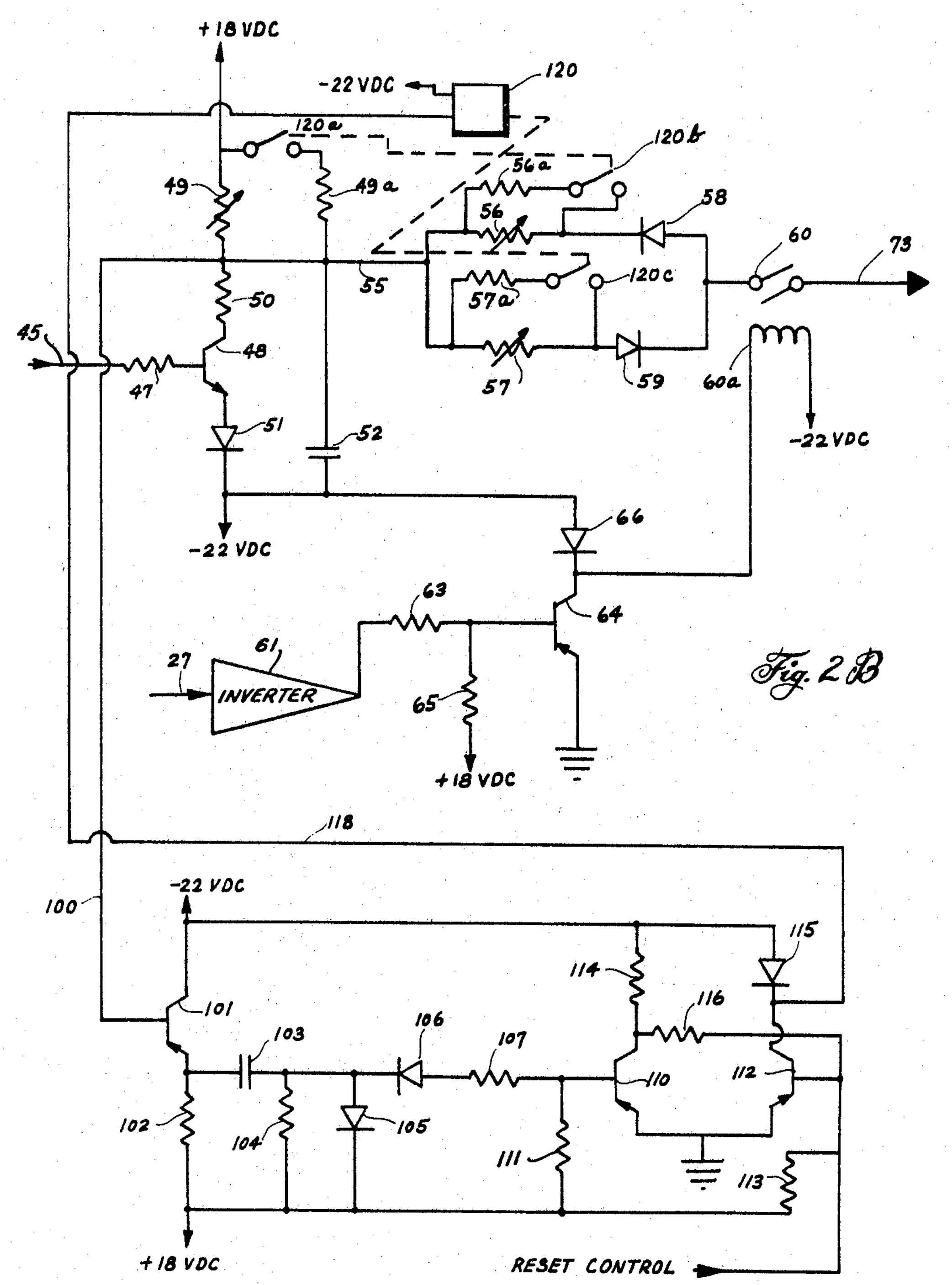

The output of the transistors 36 and 37 co-operating together resembles a very short pulse in the range of several milliseconds length depending on the circuit values selected. Such pulse is input to a transistor 48 (FIG. 2B) which operates as a saw tooth generator as will be described. As shown in FIG. 2B, input for the transistor 48 is through a series dropping resistor 47.

The transistor 48 has a collector current limiting resistor 50 while the emitter is connected to a negative supply through a diode 51. A charging capacitor 52 is connected across the resistor 50 into the negative supply for the transistor 48. A resistor 49 is communicated with supply voltage to charge the capacitor 52. In addition, a resistor 49*a* is paralleled with the resistor 49 to provide a controllable adjustment as will be described in greater detail hereinafter. The capacitor 52 is of some adequate size such as one microfarad to store and accumulate a charge provided through resistor 49 when the transistor 48 is nonconducting (its quiescent state). When an output pulse is formed in the transistors 36 and 37 and supplied to the transistor 48, conduction of the transistor 48 tends to discharge capacitor 52 through resistor 50; however, those skilled in the art will recognize that the voltage drop across the capacitor 52 does not change instantaneously; rather, the charge across the capacitor is altered during a finite interval to form one slope of a sawtooth wave form. Charging of capacitor 52 forms the other slope of the sawtooth wave form. Since the output is taken off the collector of the transistor in parallel with the capacitor, the output signal in the conductor 55 approximates a saw tooth wave form.

The conductor 55 communicates with circuit means providing hysteresis depending on whether or not the base line is being adjusted upwardly or downwardly with respect to absolute zero signal. A pair of resistors 56 and 57 are connected in parallel and communicate through a pair of oppositely-facing diodes 58 and 59 with a low-leakage reed relay 60 operated by relay winding 60*a*.

The reed relay 60 noted hereinabove is operated by the output signal of the peak recognition circuit means 26. The conductor 27 shown in FIG. 1 provides an input for inverter 61 which is input to circuitry shown in FIG. 2B, including an input resistor 63 and a transistor 64. The transistor 64 is a PNP transistor having its base biased off by resistor 65. The transistor 64 is connected to the negative supply of —20 v. DC by a diode 66. A positive signal (actually about ground potential or binary zero) to the transistor 64 indicates the occurrence of a peak as recognized by the circuitry 26 (see FIG. 1) and the positive signal prevents current flow through the relay winding 60*a* to maintain the relay in the opened position. This is desirable during the occurrence of an analytical fluctuation since it relates the operation of the circuitry described heretofore for forming a drift correction signal to the nonoccurrence of an analytical fluctuation in the signal being corrected. Quite obviously, if the relay 60 were closed and the correction signal applied to the circuitry to be described, the correction would tend to remove peaks in the signal.

The circuitry described heretofore may be denoted as correction signal generating means which forms a correction signal related to or dependent on the input signal to the apparatus of the present invention. Referring now to FIG. 2C, the signal, after passing through the relay 60, is then applied to analog memory means incorporating a capacitor 72 and a high input impedance solid state device 75. More specifically, the capacitor 72 is a high quality polystyrene capacitor which is connected to MOS field-effect transistor 75. The input impedance of the transistor 75 approximates at least ten to the fifteenth power ohms so as to prevent drainage of current from the storage means 72. In the preferred emobdiment, the capacitor selected preferably utilizes a dielectric not accumulating any voltage stresses in the dielectric to avoid the problems commensulrate with changes in stress over a period of time. In addition, the physical relationship of the capacitor 72 and the field-effect transistor 75 is made such that wiring is preferably short, adequate insulation is provided for the conductor 73, and routine installation techniques for field effect transistors are used during installation.

Circuitry is provided for operating the field-effect transistor 75 at constant current levels and with a constant voltage thereacross preferably chosen to obtain the best possible temperature drift characteristics. The source of the transistor 75 is provided with constant current flow by means of a transistor 76 which is communicated with the supply of 18 vdc. The transistor has an emitter resistor 77 and current flow through the collector of the transistor 76 is applied to the source of the transistor 75. The operating point of the transistor 76 is determined by a bias network connected to the supply voltage which includes a series resistor 78, a diode 79, another resistor 80, and a Zener diode 81. It will be recognized by those skilled in the art that the transistor 76 has a relatively well-fixed operating point and that the current flowing therethrough is essentially constant.

In addition to the constant current source connected to the source of the transistor 75, the drain of the transistor is also connected to a constant current generator. The drain is connected to a transistor 82 and current flow is communicated with the negative supply by means of emitter resistor 83. The operating point of the transistor 82 is determined by the bias network including the resistor 84, the diode 85, the resistor 86, and the Zener diode 87, said circuit elements being arranged to provide a relatively well-fixed operating point for the transistor 82. Thus, it will be appreciated that the flow of current from the source to the drain in the field-effect transistor 75 is regulated by constant current generators.

Constant voltage is maintained between the source and the drain of the field-effect transistor 75 by additional circuit means. A transistor 88 is provided with a base signal from the source of the transistor 75 and the emitter of a transistor 88 is communicated with the drain of the field-effect transistor 75 by means of the Zener diode 89. It will be appreciated that the Zener diode 89 provides a relatively constant voltage drop between the source and drain of the field-effect transistor, particularly in view of the stabilization circuitry described for the circuitry. In addition, the transistor 88 has a collector resistor 90, and the collector output voltage is coupled by a diode 91 to the emitter of an additional transistor 92. The transistor 92 is connected with its base at the emitter of the transistor 88 so that variations in current through the collector resistor 90 are divided through the diode 91 to provide greater stabilization of the transistor 88.

It will be appreciated that the voltage points provided by the circuitry stabilizing operation of the field-effect transistor may be selected to provide any offset in the output voltage in the conductor 96 as compared with the operating voltages on the memory means 72. More specifically, in the preferred embodiment, for co-operation with the V-to-F converter 18 (see FIG. 1), it is found preferable to utilize a correction signal in the conductor 96 ranging from about slightly more than zero potential to some negative value such as 8 or 10 vdc. As will be recognized by those skilled in the art, alterations in the operating points of the circuitry may be obtained by utilization of various other supply voltages differing from the +18 vdc and −22 vdc shown in the drawings.

As previously noted, the circuitry in FIGS. 2A, 2B and 2C illustrates details of the drift correction circuitry means 15 shown in FIG. 1. In summation, the circuitry may be described as accumulating charge on the storage capacitor 72 which is analogous to the correction desired to be entered at any given time. However, the circuitry shown in FIG. 2B includes additionl means providing multiple rates of operation as occasionally desired to provide maximum flexible response. Attention is directed to the transistor 48 (FIG. 2B) which provides a saw tooth wave form as an output signal which is developed across the capacitor 52. A conductor 100 provides the saw tooth wave form to an emitter follower 101. The output of the transistor 101 is developed across emitter resistor 102 which is connected to emitter voltage supply of +18 vdc. The output is connected by way of a blocking capacitor 103 which communicates with wave shaping circuitry including a resistor 104 and a diode 105. The circuitry tends to differentiate the output signal with positive derivatives being grounded by the diode 105 whereas negative signals are passed by the series diode 106 to the series resistor 107. The resistor 107 provides an input for bistable circuitry as will be described.

A pair of transistors 110 and 112 are so connected to provide a bistable device triggered by the output of the emitter follower 101. The transistor 110 is provided with a bias voltage through the resistor 111 as is the transistor 112 which is provided with a bias resistor 113. Transistor 110 includes collector resistor 114 whereas the transistor 112 is provided with a diode 115 as collector load. The collector output signal of the transistor 110 is provided by a resistor 116 to the base of the transistor 112.

The bistable circuitry including transistors 110 and 112 is turned on by a pulse from the emitter follower 101. The circuitry is turned off by a control labeled reset control which permits the operator of the apparatus to reverse the condition of the bistable circuitry. As will be appreciated by those skilled in the art, the designations off and on are equated to directing heavy conductions to first one of the transistors and then to the other.

A conductor 118 derives an output from the collector of the transistor 112 and provides same to a relay 120. The relay 120 is provided with negative collector suppy voltage useful for the transistor 112 so that conduction of the transistor 112 draws current through the relay 120. The relay 120 operates relay contacts **120*a* for placing the resistor 49*a* in parallel with resistor 49. It will be appreciated that the additional resistance in parallel with resistor 49 alters the characteristics of the saw tooth generator and is adapted to speed up operation of the saw tooth generator by flowing current at a greater rate into the storage capacitor 52 to form the saw tooth wave form. In addition, the relay 120 includes relay contacts 120*b* and 120*c* which are connected to place parallel resistances 56*a* and 57*a* across resistors 56 and 57, respectively. The effective or net resistance provided by the above-mentioned means results in greater current flow to the reed relay 60 and results in a faster accumulation of charge on the storage capacitor 72. Thus, again when it is desired to speed the rate of storing charge in the memory means, operation of the relay 120 will permit faster current flow through the series resistors to the capacitor 72. This is particularly useful in situations wherein the signal from the signal source 10 passes through large excursions quite removed from base line value. In such events, the present invention preferably tracks more accurately the wide range of fluctuations of the signal resulting from operation of the relay 120. Referring again to the earlier described apparatus shown in FIG. 2B, large signal changes result in an enlarged saw tooth wave form from the transistor 48 which is provided over the conductor 100 to the emitter follower 101**. The emitter follower provides the proper output for trigger operation of the bistable circuit connected thereto which provides a signal to the relay causing same to operate.

Figure 3:
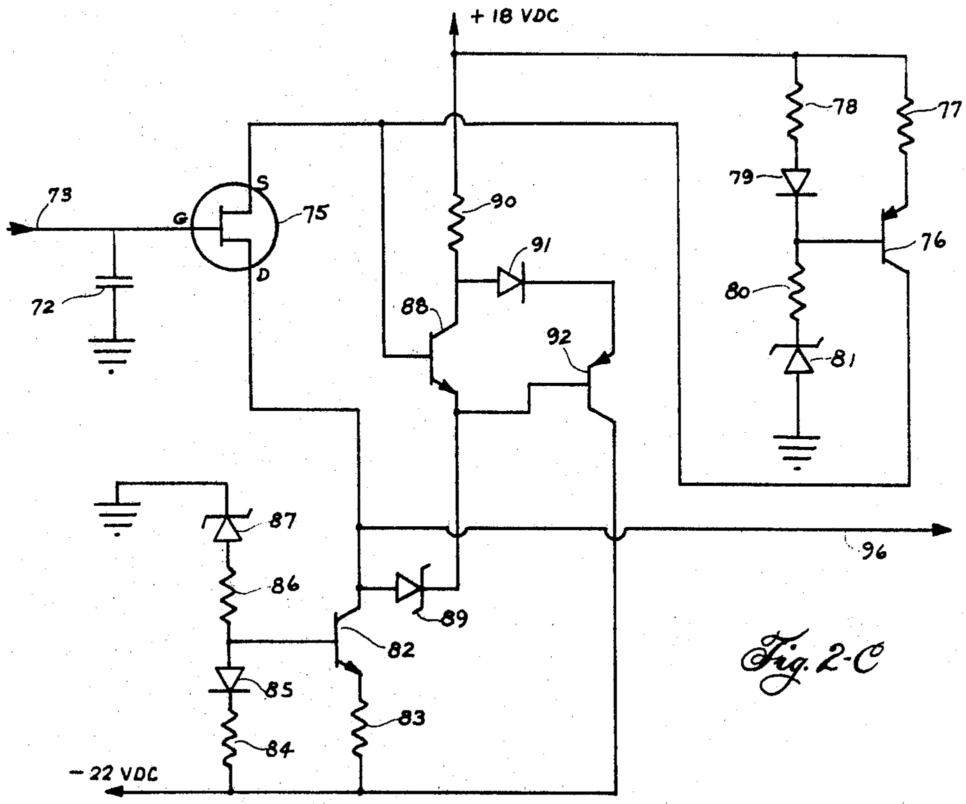
FIG. 3 is a schematic wiring diagram illustrating connection of means for controllably altering the base line value.
Figure 3:
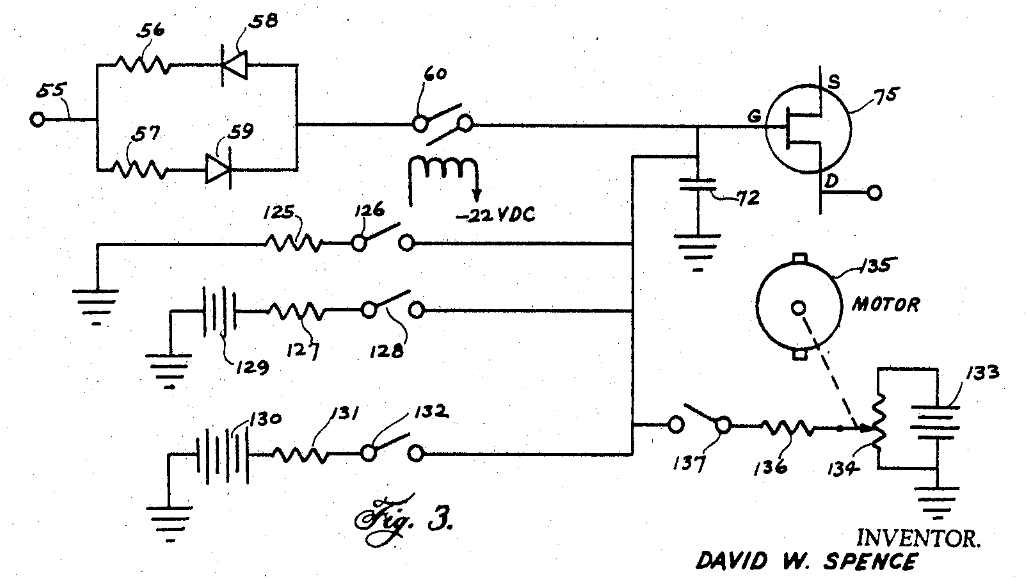

Those skilled in the art will appreciate that not all signal phenomena is well served by a fixed base line for the output signal indicative thereof. As an example certain chromatographic procedures may utilize programed temperature acceleration wherein the base line moves ever upwardly as the analysis proceeds. The offset of the base line occurring during the passage of time may be exponential or may be linear, and the example may be further extended to encompass any predetermined wave form desired. In any event, reference is made to FIG. 3 which reillustrates portions of the circuitry shown in FIGS. 2B and 2C, and which more particularly illustrates the conductor 55 which supplies current for the storage capacitor 72 which is connected to the field-effect transistor 75. Such circuitry is illustarted to show connection of the circuitry to be described as an aid to understanding the present invention. As previously described, the relay 60 is operated to the open position when a peak is occurring in the wave form of the signal so that charging of the capacitor 72 is interrupted to the end that tracking of the base line variations is halted. As described, the charge on the capacitor may be stored for several hours and will not appreciably change because the possibility of leakage from the capacitor is limited. However, it may be actually desirable to bleed the charge on the capacitor to ground which, over a period of time, provides an exponential wave form output from the transistor 75. Means are provided for exponential decay of the charge on the capacitor 72 and are represented in FIG. 3 by the resistor 125, which is connected to the memory means 72 by a switch 126. The resistor 125 is grounded so that operation of the switch 126 to the closed position will exponentially decay the analog value stored in memory to zero in accordance with the time constant of the circuitry. As an additional alternative, another resistor 127 is connected to the capacitor 72 by way of a switch 128 and is adapted to exponentially decay the charge on the capacitor to some negative voltage provided by the battery 129. Again, the time constant of the exponential decay is given by the circuitry as illustrated.

Additional means is provided for decaying the charge on the capacitor 72 exponentially to some positive value. For instance, a battery 130 is serially connected to a resistor 131 and to a switch 132 and the circuitry is arranged as illustrated to exponentially decay the voltage stored on the means 72 to some positive voltage level. The time constant of the circuitry is dependent on the values of the capacitor and resistor.

Another arrangement is also illustrated in FIG. 3 for controllably changing the values stored in the analog memory even when the relay 60 is in the open position and which means may be adapted in accordance with a predetermined program. In FIG. 3, the numeral 133 indicates a voltage source across which is connected a potentiometer 134, said voltage source having one terminal grounded. The wiper arm of the potentiometer is mechanically connected to a motor 135 which drives the wiper arm to selected points on the potentiometer 134. The wiper arm is connected by way of a series resistor 136 and switch 137 to provide a programable voltage to the capacitor 72 which will execute any function desired in response to control of the motor 135. For instance, the motor 135 may be operated for a controllable period of time at a constant speed whereupon a linear sweep is provided. Such means may be used, by way of example and not limitation, to provide a programable compensating voltage which accommodates the increasing base line experienced during chromatographic analysis at advanced temperatures such as occasioned by analysis of samples having heavy tars which normally require an excessivey long interval of time for analysis. As a further example, the motor 135 may be used to generate sinusoidal wave forms, ramps, saw tooths, and the like.

The various circuits shown for altering the voltage stored on the capacitor 72 may also be operated when the relay 60 has operated to close the relay contact to current flow through the conductor 55 during tracking.

Figure 4:
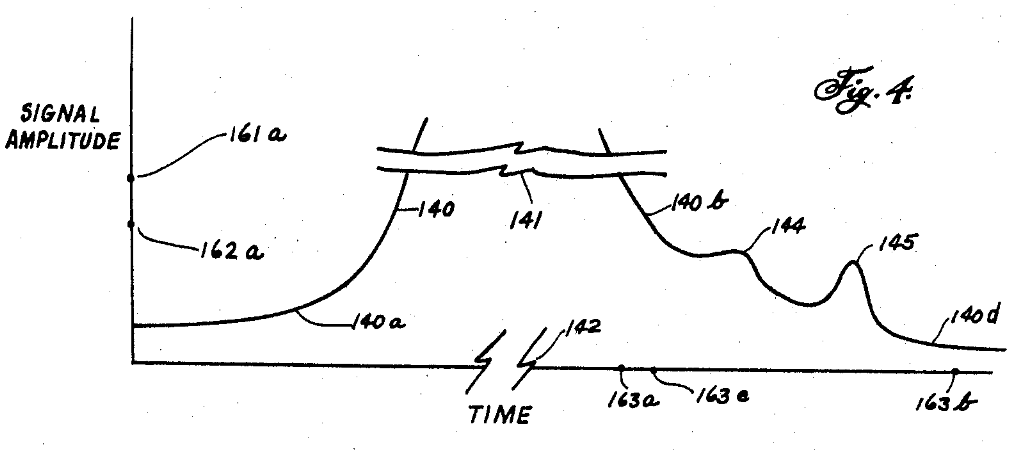
FIG. 4 is a graph illustrating small obscure fluctuations at the trailing portions of a larger analytical fluctuation.

Attention is next directed to FIG. 4 which is a graph of voltage versus time and which represents a typical phenomena occurring, by way of example and not limitation, in chromatographic analysis. A voltage wave form 140 is represented in FIG. 4 and is shown interrupted at 141 to indicate that the maximum amplitude is quite large but the actual value thereof is not particularly important to an understanding of the apparatus to be described. In addition, the ordinate is interrupted at 142 to indicate that the peak in the voltage signal may extend over a long interval of time or may be quite narrow without affecting operation of the present invention. The wave form includes an onset at **140*a* at which the large analytical fluctuation begins and the wave form terminates at 140*b* and gently curves back to a base line value indicated at 140*d*. It should be noted that in the trailing portions of the large analytical wave form that a pair of small peaks 144 and 145** are indicated by way of example to further describe the present invention. Of course, other examples can be pointed out wherein smaller analytical signal peaks are obscured by larger analytical signals and the details may vary from that shown in FIG. 4.

Figure 5:
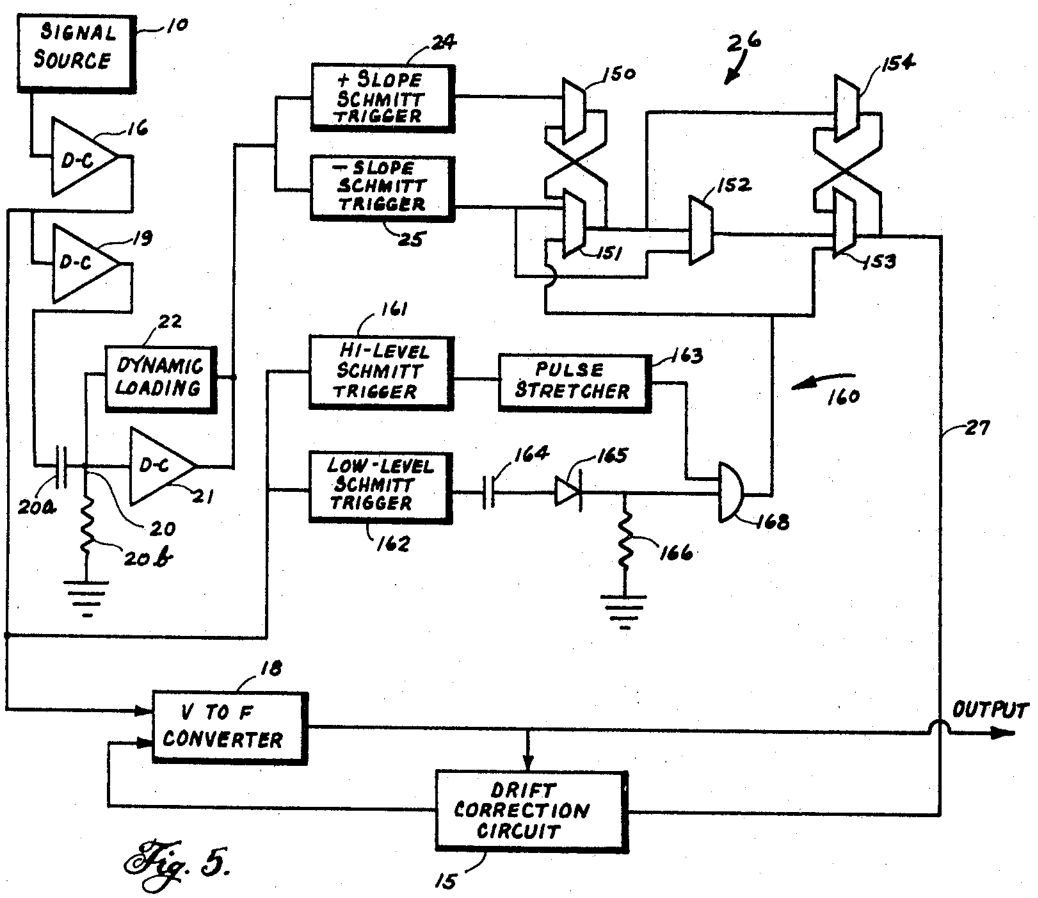
FIG. 5 illustrates one modification of the present invention for improved detection of small peaks such as those shown in FIG. 4.

Apparatus is shown in the modification of FIG. 5 which accommodates the large voltage fluctuation 140 and which also detects the small fluctuations 144 and 145 thereafter. Shown in FIG. 5 is most of the circuitry shown in FIG. 1 which is modified to incorporate additional means as will be described. The peak detecting means indicated at 14 remains unaltered with the exception that the peak recognition circuit is shown in greater disclosure. In addition, the drift correction circuit 15 co-operates with the V-to-F converter 18 in the previously-described manner. For a better understanding of the means of FIG. 5, a preliminary description of the peak recognition circuit 26 is helpful.

The peak recognition circuitry 26 recognizes the sequence of positive slope, zero slope, and negative slope as indicated by the Schmitt triggers 24 and 25. The Schmitt triggers 24 and 25 are connected to a plurality of NOR gates which provide an output signal or level in the conductor 27 which indicates the occurrence of a peak. It may be appreciated that the peak signal in the conductor 27 is co-extensive with the time existence of the peak in the analytical signal (it will extend from onset to termination). Brieffy, on occurrence of positive slope, the Schmitt trigger 24 provides an output binary one to the gate 150 which causes an input of binary zero to the gate 151. All otherO inputs to the gate 151 being zero, its output is a binary one which is reapplied to the gate 150 to latch same and the output is also provided to a gate 152. The gate 152 provides a binary zero output which is applied to a gate 153. The output of the gate 153 is a binary one which is also applied to the input of the NOR gate 154 to form a binary zero output also. The gate 154 is latched to the gate 153 to provide the gate 153 with all binary zero inputs which results in a binary one output on the conductor 27. Thus, it can be seen from the foregoing description that the onset of a peak wave form such as the analytical wave form 140 shown in FIG. 4 generates *a* binary one in the conductor 27 as an indication of a peak signal.

As will be appreciated, the slope of a peak wave form of the simplest configuration passes through the sequence of positive slope, zero slope, and negative slope. Thus, at the maximum amplitude of the wave form 140, the slope becomes zero and the binary one output of the Schmitt trigger 24 is taken away from the gate 150. However, the gate 151 which is latched to the gate 150 continues the binary one input to the gate 150 so that the termination of the positive slope signal from the Schmitt trigger 24 has no effect on the peak recognition circuit 26 and the output of the conductor 27 continues to indicate the occurrence of a peak.

After reaching the peak, the level of an analytical wave form begins to fall towards the base line or decreases with negative slope On occurrence of negative slope, the Schmitt trigger 25 provides a binary one output indicative of negative slope The binary one output from the Schmitt trigger 25 is applied to the gate 151 and requires a binary zero output therefrom. In addition, the output of the Schmitt trigger 25 is also applied to the gate 152 and requires a binary zero output therefrom also. The gate 153, which had three binary zero inputs on occurrence of positive slope and zero slope, continues with three zero inputs and maintains a binary one output during negative slope. The binary one output is also applied to the gate 154 to maintain same in the previous state of conduction so that the gate 153 is unaltered by negative slope. Again, the signal indicating the occurrence of peak fluctuations in the wave form is maintained in the conductor 27.

With the gates in the above-described conducting conditions, attention is derirected to FIG. 4 to relate the operation of the peak recognition circuitry 26 to the termination of a peak. It is desirable to simulate the termination of the large peak 140 and to this end, means are provided at 160 for simulating the termination of the large peak. Referring again to the Schmitt trigger 25, when the large analytical wave form is terminated, the binary one output from the Schmitt trigger 25 is terminated and the output of the gate 153 becomes a binary zero. The termination of the peak level in the conductor 27 is carried out by inputing a binary one to the gate 153. In like manner, the means 160 inputs a binary one to the gate 153 to simulate the termination of the large analytical wave form and set up the apparatus for indicating a separate albeit small peak occurring thereafter.

The output of the DC amplifier 16 is applied to a pair of Schmitt triggers 161 and 162. The Schmitt triggers 161 triggers at a higher level than the trigger 162. Reference is made to FIG. 4 wherein such levels are indicated at **161*a* and 162*a*, respectively, with respect to the large analytical wave form. Those skilled in the art will appreciate that the component values of the Schmitt triggers 161 and 162 may be selected so that the circuits provide level sensing at the controllable levels as indicated in FIG. 4. The output of the Schmitt trigger 161 is connected to a pulse stretcher 163. Suitable means for a pulse st retcher may incorporate a monostable multivibrator or the like for maintaining an output from the Schmitt trigger 161 for an additional, arbitrarily selected interval of time. Reference is made again to FIG. 4 wherein the numeral 163*a* indicates the time at which the Schmitt trigger 161 interrupts conduction because the input wave form drops below the level 161*a*. By way of example and not limitation the pulse stretcher 163 operates to maintain the output of the Schmitt trigger 161 for an interval represented between the points 163*a* and 163*b*** on the axis of the graph in FIG. 4.

The output of the Schmitt trigger 162 is coupled through a capacitor 164, series diode 165 and a shunted-to-ground resistor 166. The capacitor differentiates the level output by the Schmitt trigger 162 although the diode 165 limits the difference to provide only positive output signals indicative of level changes of the Schmitt trigger 162. The outputs of the differentiated signals and the pulse stretcher 163 are coupled to an AND gate 168. The output of the AND gate is applied by way of a conductor to the previously-described NOR gate 153 to serve as a reset pulse. Additionally, the gate 151 is reset by the output of the AND gate 168. Coincidence of inputs to the gate 168 provides a reset pulse to the peak recognition circuitry 26. As previously described, such reset pulse simulates or effects the termination of the end of the peak of the large analytical wave form 140. Such simulation occurs at the time 163*a* indicated in the graph of FIG. 4.

When the peak signal is terminated in the conductor 27, the circuitry shown in FIG. 2 operates to cancel the remainder of the wave form associated with the large analytical peak. More specifically, the trailing portions of the large analytical wave form 140 are cancelled approximately from the time 163*e* by operation of the base line correcting circuitry means of the present invention. The signal on the conductor 27 (see FIG. 2) operates the reed relay 60 to apply the correction signal to the analog memory means 72. It has been previously noted that the means for generating a correction signal operates continuously to provide such a correction signal in the conductor 55 wherein the signal is controllably applied to the analog memory means 72 by the relay 60. The signal in the conductor 27 then effects cancellation of the remainder of the wave form 140 extending from the time 163*e*.

It should be noted that the reset signal generated by the means 160 subsists for only a short interval of time since the output of the low level Schmitt trigger 162 is differentiated which effectively makes the gate 168 a pulsed AND gate. Thereafter, the peak recognition means 26 is prepared for recognition of immediately-following peaks such as those represented by way of example at 144 and 145 in FIG. 4. The short interval of the reset pulse which enables the peak recognition means to immediately recognize an additional peak also operates the drift correction circuitry to provide base line correction which may be terminated again by operation of the relay 60. Such might occur when the peak 144 is detected by the peak detection means 14 and the peak recognition means 26 is thereafter operated to place the relay 60 in an opened condition. It should be noted that when such does occur, the analog memory holds the last value input thereto whereby cancellation of the trailing portion of a larger peak 140 beneath the smaller peak 144 is effected.

The portion of the larger peak beneath the smaller peak 144 generally approximates an exponential curve so that it may be found helpful to incorporate circuitry means such as those shown in FIG. 3 for decaying the value in the analog memory to fully approximately cancel the trailing portion of the large wave form. More specifically, reference is made to the resistor 125 and the switch 126 shown in FIG. 3 as one means which can effect exponential decay of the trailing portions of the larger peak wave form. Such means may be incorporated with the structure shown in FIG. 5, by way of example and not limitation, by utilizing the output of the AND gate 168 to operate a holding relay incorporating the switch 126. This will provide a continual decay of the value stored in memory without regard to opening or closing of the reed relay 60.

A similar alteration of the present invention may be accomplished by providing the exponential decay of the value in the analog memory 72 as an additional input to the DC amplifier 19 shown in FIG. 5. This is sometimes helpful because the rate of increase of the small peak 144 (see FIG. 4) is approximately equal to the rate of decrease of the larger peak which is added to the smaller peak. The input signal to the peak recognition means 14 (see FIG. 5) will have approximately zero slope so that it is difficult for the differentiating means 20 to recognize the small peak. Thus, it would be helpful to also provide the output of the means for adding the correction signal to the amplifier 19 as an input which also approximately cancels the trailing portions of the larger analytical wave form. The resultant voltage differentiated by the differentiating means 20 will then have a quiescent voltage approximating the base line signal from which extends the very small peaks 144 and 145 and wherein the slopes of the small peaks are sensed more accurately to enable more accurate differentiation thereof.

The above-described simulation of peak termination and associated readjustment of the charge stored in memory 72 destroys the stored value of the original base line existing prior to the onset of the large peak 140 (see FIG. 4). The loss of the stored value of original base line results from the use of the memory means 72 as the capacitive source to form the exponential decay through a grounded resistor (see resistor 125 in FIG. 3). As an alternative, multiple analog memories are used to store the original base line drift correction value and to serve as the capacitive source forming the exponential decay.

Figure 6:
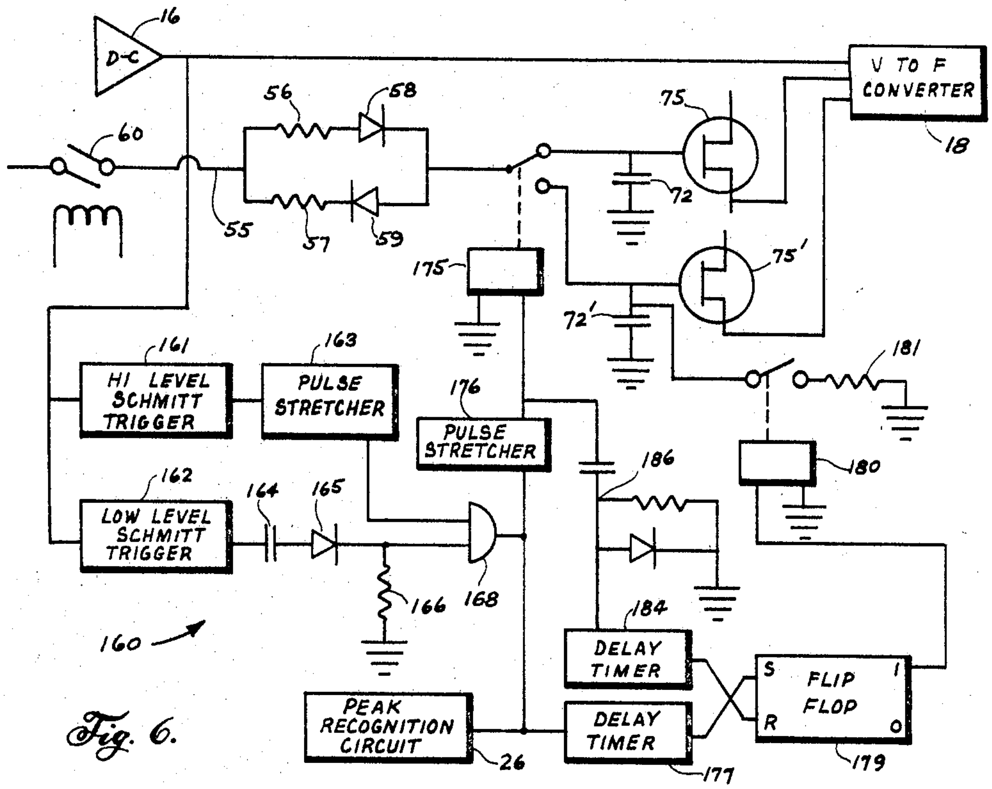
FIG. 6 is a modification of the circuit shown in FIG. 5.

Attention is directed to FIG. 6 which illustrates a variant structure based on the use of multiple analog memory devices. In FIG. 6, a relay 175 is operated by the reset pulse applied to the NOR gates in the peak recognition means 26 and switches the signal in the conductor 55 from the analog memory 72 to the memory 72'. The signal to the relay 175 is supplied through a pulse stretcher 176 which maintains the relay 175 in an operated condition for an extended interval of time even after the AND gate 168 terminates its output signal. The pulse stretcher 176 is conventional circuit means such as a monostable multivibrator.

The output of the correction signal generating means is directed from the analog memory 72 to memory 72' to charge the memory 72' to a value corresponding with a trailing portion of the large analytical wave form. Referring to FIG. 4, the wave form 140 triggers the low level Schmitt trigger 162 to form an output at the AND gate 168 and initiate charging of the capacitor 72' with the output of the MOS transistor 75' connected to the V-to-F converter 15 as an additional input. Because the capacitance of the capacitor 72' is relatively high, perhaps as long as a second or two is required to charge the condenser 72' to the desired level. It is best to withhold initiation of the exponential decay until the capacitor 72' has been charged to the desired level, and to this end, a delay timer 177 is connected to the AND gate 168 for operation of circuitry controlling the exponential decay.

The delay timer 177 provides an output pulse some one or two seconds after operation of the relay 175 to permit proper charging of the condenser 72' and applies the output pulse to the set terminal of a flip flop 179, thereby forming an output pulse at the one terminal which is supplied to a relay 180. The relay 180 grounds the capacitor 72' through a resistor 181 to effect exponential decay of the value placed on the plates of the capacitor 72'. It should be recognized that the correction signal generating means might flow current to the memory 72' while the resistor 181 discharges the memory. Charging current from the correction signal generating means is subjected to control of the relay 60 (see FIG. 2) which opened or closed in response to the peak recognition means 26. Recalling that the means 26 indicates the peaks in the input signal for the present invention, the memory 72' is charged to a level, exponentially discharged during a small peak (such as peak 144 in FIG. 4) with the relay 60 open, and the relay 60 operates between the peaks 144 and 145 to readjust the value in memory 72' for again exponentially discharging to cancel the trailing portions of the large peak 140 obscuring the second small peak 145. Thus, the extent of cancellation beneath the second small peak 145 is made more nearly correct by charging the memory anew and the exponential decay beneath the first small peak is not relied on.

Since FIG. 4 illustrates well the fact that the need for cancellation is limited to a relatively short interval of time, the pulse stretcher 176 is constructed and arranged to time out when the signal has had sufficient time to return very nearly to base line value. The relay 175 is deenergized and restores the connection of the correction signal generating means to memory 72. A delay timer 184 is triggered by the differentiated trailing edge of the level switching output from the pulse stretcher 176. The differentiation circuit 186 includes a grounded diode which grounds the derivative of the forward portion of the level switching. On inputting a pulse to the delay timer 184, the delay withholds opening of the relay 180 to permit discharging of any residual charge in memory 72' through the resistor 181. After discharge, the converter 15 is not provided any unwanted offset signals resulting from the continued storage of residual charge.

The present invention includes means for providing a slight hunting in the base line value stored in analog memory. As previously noted, the transistor 48 (see FIG. 2) outputs the saw tooth wave form and provides a current source operating through a series resistor and diode into the analog memory device 72. Preferably, the series resistor feeding the capacitor 72 is selected so that the sweep of the hunting current is quite small with respect to the base line value and the circuitry is preferably arranged so that the hunting occurs sufficiently rapidly that the period thereof is quite short. In addition, the circuitry shown in FIG. 2 includes means operating the relay 120 which alters the tracking rate of the hunting signal applied to the analog memory 72. Preferably, the tracking rate is somewhat limited to enable the circuitary to follow minute base line changes during normal operations and the greater tracking rate is provided to enable large swings in the stored value at the capacitor 72 on occurrence of vary large voltage fluctuations when the requirements for accuracy are not quite so severe.

Figure 7:
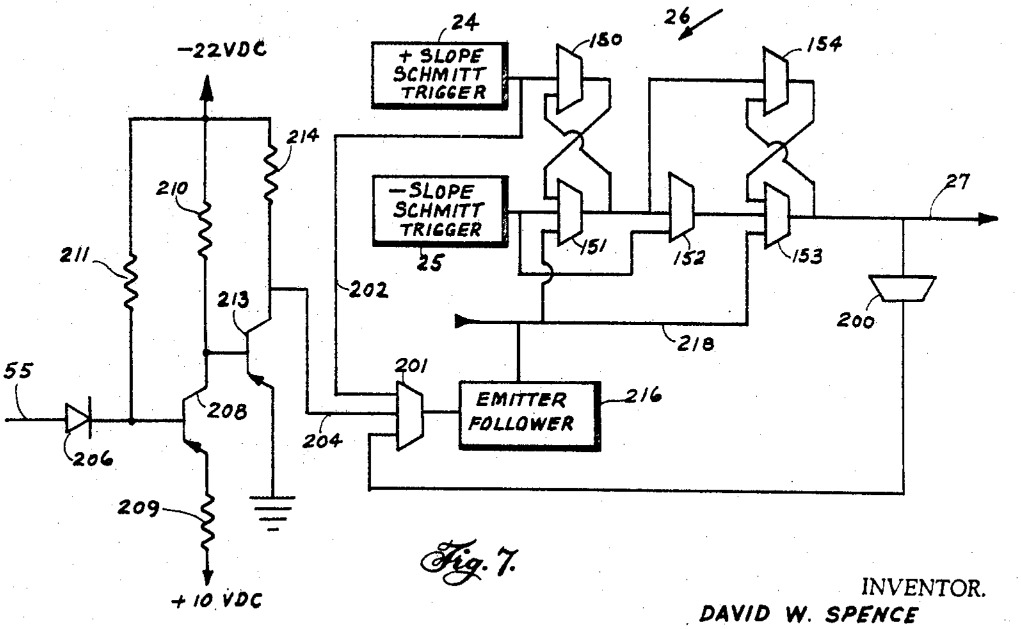
FIG. 7 is a further modification of the present invention shown in a schematic wiring diagram.

Attention is directed to the circuitry shown in FIG. 7 which illustrates means for sensoring return of analytical fluctuations to base line conditions whereby base line detection is improved. As presently described and disclosed herein, the apparatus of the present invention cooperates with an analytical signal to detect analytical fluctuations therein by reference to the rate of change of slope of the analytical signal, that is, peak onset has been defined as positive slope exceeding a predetermined slope and extending for more than a predetermined interval of time and peak termination has been defined in the same manner with appropriate consideration given to the proper sign of the values. The means shown in FIG. 7 and presently described will correlate peak sensing slope detection with means for relating the amplitude of the signal to the slope. Thus, the circuitry shown in FIG. 7 includes the previously described Schmitt triggers 24 and 25 which co-operate with the peak recognition circuit 26 and the additional circuitry shown therein which provides a simulated reset signal to the peak recognition circuitry 26 as will be described hereinafter.

It can be recalled from a discussion of the circuitry shown in FIG. 2 that the transistor 48 and the capacitor 52 paralleled therewith function as a sawtooth generator with the output signal on the conductor 55. In FIG. 7, the conductor 55 is also communicated with circuitry shown therein whereby the pulse rate resulting from operation of the sawtooth generator is applied to the circuitry means in FIG. 7. It can be appreciated that a relatively low rate of operation of the sawtooth generator reflects essentially base line conditions whereas a more rapid rate indicates some elevated value which is most likely associated with an analytical fluctuation and which is therefore representative of data to be counted. Therefore, the means shown in FIG. 7 co-operates with the signal on the conductor 55 to further improve peak detection as will be described.

In FIG. 7, the positive and negative slope Schmitt triggers 24 and 25, respectively, are shown co-operating with the peak recognition circuit means 26 which incorporates the illustrated NOR gates for forming the signal on the conductor 27. The signal on the conductor 27 indicates occurrence of a peak signal by placing a binary one on the conductor. The binary one on the conductor during a peak is inverted by NOR gate 200 and supplied as an input for a NOR gate 201. The positive slope Schmitt trigger 24 forms a binary one output on occurrence of positive slope or forms a binary zero at other times. A conductor 202 is communicated from the Schmitt trigger 24 to the NOR gate 201 for inputting a binary zero during occurrence of slope which is not positive, or during occurrence of slope which is essentially level or even negative slope. In addition, the conductor 55 communicates with circuitry means in putting a signal on the conductor 204 which is a binary zero if the signal on the conductor 55 represents a high pulse rate from the sawtooth generator including the transistor 48.

The signal on the conductor 55 is normally positive when the pulse repetition rate of the sawtooth generator is low. The diode 206 communicates the signal with DC amplifier means which provide the proper output level on the conductor 204 so that the signal on the conductor 204 may be termed a binary signal. Binary one indicates a relatively low count rate normally associated with base line signals, and, therefore, the absence of analytical signals, and binary zero indicates occurrence of a signal amplitude practically always indicative of useful information.

The diode 206 is communicated with a transistor 208 having an emitter resistor 209 and a collector resistor 210. Biased operation of the transistor 208 is provided by resistor 211 communicated with the negative supply. The output of the transistor 208 is communicated directly to the base of transistor 213 having a collector resistor 214. The conductor 204 is communicated with the collector of the transistor 213 as shown in FIG. 7.

The transistors and resistors are selected so that the DC amplification of the signal input through the diode 206 is such that a relatively low count provides a positive input voltage to the circuitry to form a binary one on the conductor 204. A more rapid rate of operation of the sawtooth generator including the transistor 48 and the capacitor 52 requires that the transistor 48 be conducting for a greater interval of time which tends to keep the capacitor 52 essentially discharged. Since one plate of the capacitor 52 is tied directly to a negative voltage, the higher pulse rate tends to provide an output voltage on the conductor 55 which is negative. This relatively negative voltage is communicated through the conductor 55 and the diode 206 is provided with its polarity such that negative voltage is placed on the base of the transistor 208. This results in conduction therethrough causing an approximately ground potential output at the collector of transistor 213 or the conductor 204. This places a binary zero in the conductor 204 indicating the pulse rate of operation of the sawtooth generator 48 is not low, or, alternatively, is relatively high and therefore indicates a value which is of some importance. The coincidence of binary zeros at the inputs of the NOR gate 201 is communicated through emitter follower 216 to a conductor 218 and serves as means preventing loading of the gate 201 and provides a signal in the conductor 218 resetting the peak recognition circuit means 26. The conductor 218 is an input to the gates 151 and 153 as shown in FIG. 7. It should be noted that other sources of reset pulses communicated through the line 218 are possible.

As it will be appreciated by those skilled in the art, the circuitry shown in FIG. 7 co-operates with the peak recognition circuit means to provide a peak indicating signal which is related to both the slope of the signal and which also utilizes information derived from the amplitude of the signal.

Broadly, the present invention relates to improved circuit means as discussed hereinabove.

What is claimed is:

1. A base line drift corrector for use with analytical measuring instruments which produce measurement signals having recurrent data fluctuations which extend from a base line value comprising:

means for receiving the measurement signal from the measuring instrument;

correction signal generating means responsive to the measurement signal for generating a correction signal dependent on the base line value of the measurement signal and the drift therein;

switch circuit means having an input coupled to the output of the correction signal generating means;

memory circuit means coupled to the output of the switch circuit means and including a capacitor for storing the correction signal and a high input impedance signal transfer device connected to the capacitor for providing an output signal for the memory circuit means;

circuit means for recognizing the occurrence of data fluctuations in the measurement signal for controlling the operation of the switch circuit means for coupling the output of the correction signal generating means to the input of the memory circuit means during the non-occurrence of data fluctuations and for interrupting this connection during the occurrence of data fluctuations;

and circuit means for combining the output signal of the memory circuit means with the measurement signal to correct same for base line drift.

2. A base line drift corrector in accordance with claim 1 wherein the output signal of the memory circuit means is made opposite in polarity to the drift in the base line value and is added to the measurement signal to return the base line level to a drift free value.

3. A base line drift corrector in accordance with claim 1 which further includes a voltage source connected to the memory circuit means by impedance means for altering the signal stored on the capacitor.

4. A base line drift corrector in accordance with claim 1 and further including signal generator circuit means coupled to the memory circuit means for altering the signal stored on the capacitor in accordance with the output wave form of this signal generator circuit means.

5. A base line drift corrector in accordance with claim 1 and further including circuit means connectable to the memory circuit means for modifying the signal stored on the capacitor.

6. A base line drift corrector in accordance with claim 5 wherein the circuit means connectable to the memory circuit means is an impedance means connected to a voltage source.

7. A base line drift corrector in accordance with claim 1 wherein the signal path formed by the output circuit of the correction signal generating means, the switch circuit means and the input circuit of the memory circuit means includes in series therein circuit means having a voltage delay in increasing and decreasing the signal stored on the capacitor.

8. A base line drift corrector in accordance with claim 7 wherein the voltage delay circuit means includes a pair of parallel conducting paths one of which includes a unidirectional current flow device for enabling current flow toward the memory circuit means and the other of which includes a unidirectional device for enabling current flow toward the correction signal generating means.

9. A base line drift corrector in accordance with claim 8 and further including means for altering the resistances of the unidirectional conducting paths.

10. A base line drift corrector in accordance with claim 1 for use in adjusting the base line value after a large data fluctuation to enable detection of small data fluctuations occurring during the trailing portion of the large fluctuation and including:

circuit means for sensing the trailing portion of a large data fluctuation for momentarily actuating the switch circuit means for momentarily supplying the correction signal to the memory circuit means for enabling the output signal of the memory circuit means to return the measurement signal to the base line level;

and circuit means for thereafter decaying the signal stored on the memory circuit capacitor such that the trailing portion of the large data fluctuation is approximately cancelled and the measurement signal provides an approximately fixed base line level on which small data fluctuations are more readily distinguishable.

11. A base line drift corrector in accordance with claim 10 wherein the circuit means for decaying the signal stored on the capacitor includes means for causing the trailing portion of the large data fluctuation to be cancelled by exponential decay of the signal stored on the capacitor.

12. A base line drift corrector in accordance with claim 10 wherein the circuit means for sensing the trailing portion of a large data fluctuation includes level sensor circuit means.

13. A base line drift corrector in accordance with claim 10 wherein the circuit means for sensing the trailing portion of a large data fluctuation includes a pair of level sensor circuits for sensing two different voltage levels characteristic of voltage levels occurring on the trailing portion of a large data fluctuation, circuit means coupled to the outputs of the level sensor circuits for producing a control signal when the level sensor circuits are activated in a sequence which indicates the occurrence of a decreasing portion of a data fluctuation and circuit means for supplying this control signal to the circuit means for controlling the operation of the switch circuit means.

14. Apparatus for use with analytical measuring instruments which produce measurement signals having recurrent data fluctuations which extend from a base line value comprising:

means for receiving the measurement signal from the measuring instrument;

voltage-to-frequency converter means responsive to the measurement signal for producing a repetitive signal having a repetition rate proportional to the amplitude of the measurement signal;

drift correction circuit means responsive to the repetitive signal for sensing base line drift for supplying to the input of the voltage-to-frequency converter means a signal for minimizing such base line drift;

slope-sensitive circuit means responsive to the measurement signal for producing signals indicating the occurrences of positive and negative slopes in the measurement signal;

peak recognition circuit means responsive to the signals produced by the slope-sensitive circuit means for producing a control signal during the occurrence of a data fluctuation in the measurement signal and for supplying such control signal to the drift correction circuit means for disabling the operation of the drift correction circuit means during the occurrence of the data fluctuation;

and amplitude-sensitive circuit means responsive to the measurement signal for supplying to the peak recognition circuit means a signal for terminating the control signal before the termination of the data fluctuation.

15. The apparatus of claim 14 wherein the peak recognition circuit means includes binary logic circuit means for producing the control signal and reset circuit means for resetting this binary logic circuit means and wherein the amplitude-sensitive circuit means includes a pair of level sensor circuits for sensing two different voltage levels characteristic of voltage levels occurring on the trailing portion of a large data fluctuation, circuit means coupled to the outputs of the level sensor circuits for producing a reset signal when the sequence of operation of the level sensor circuits indicates the occurrence of a decreasing portion of a data fluctuation and circuit means for supplying this reset signal to the reset circuit means of the peak recognition binary logic circuit means.

References Cited

UNITED STATES PATENTS

| | | | |
|---|---|---|---|
| 3,177,482 | 4/1965 | Chase | 340—347 |
| 3,351,932 | 11/1967 | Hibbits et al. | 340—347 |
| 3,359,410 | 12/1967 | Frisby et al. | 235—183 |
| 3,366,948 | 1/1968 | Price | 340—347 |

MALCOLM A. MORRISON, Primary Examiner

F. D. GRUBER, Assistant Examiner

U.S. Cl. X.R.

73—23.1; 235—92, 151.35; 307—271, 279; 328—162, 165